United States Patent [19]

Chuang et al.

[11] Patent Number: 4,799,152

[45] Date of Patent: Jan. 17, 1989

[54] PIPELINE FEEDBACK ARRAY SORTER WITH MULTI-STRING SORT ARRAY AND MERGE TREE ARRAY

[75] Inventors: Henry Y. H. Chuang, Pittsburgh, Pa.; Guo He, Wuhan, China

[73] Assignee: University of Pittsburgh, Pittsburgh, Pa.

[21] Appl. No.: 660,465

[22] Filed: Oct. 12, 1984

[51] Int. Cl.⁴ .......................... G06F 7/36; G06F 15/00
[52] U.S. Cl. ................................... 364/200; 364/736; 340/146.2
[58] Field of Search ... 364/200 MS File, 900 MS File, 364/736; 340/146.2

[56] References Cited

U.S. PATENT DOCUMENTS

| | | | |
|---|---|---|---|
| 4,445,171 | 4/1984 | Neches | 364/200 |
| 4,475,173 | 10/1984 | Talmi | 364/900 |
| 4,490,811 | 12/1984 | Yianilos et al. | 364/900 |
| 4,493,048 | 1/1985 | Kung et al. | 364/728 |
| 4,513,372 | 4/1985 | Ziegler et al. | 365/230 |
| 4,514,826 | 4/1985 | Iwata et al. | 364/900 |
| 4,520,456 | 5/1985 | Miranker et al. | 364/900 |
| 4,567,572 | 1/1986 | Morris et al. | 364/900 |
| 4,588,255 | 5/1986 | Tur et al. | 364/728 |
| 4,639,857 | 1/1987 | McCanny et al. | 364/200 |

FOREIGN PATENT DOCUMENTS 58-129650 8/1983 Japan.
59-022138 2/1984 Japan.

OTHER PUBLICATIONS

"Triangular Sorters: a VLSI Systolic Architecture for Sorting", Technical Report No. GIT-ICS-84/13, Chen et al., Apr. 1984, School of Information and Computer Science, Georgia Institute of Technology.
Chen et al.: "Sorting with Systolic Architecture", Proceedings of 1985 International Conference on Parallel Processing, Aug. 20–23, 1985, pp. 865–868.

Primary Examiner—Raulfe B. Zache
Assistant Examiner—Thomas C. Lee
Attorney, Agent, or Firm—Reed Smith Shaw & McClay

[57] ABSTRACT

A feedback array sorter comprising a multi-string sort array having m inputs and outputs and a first buffer memory having m inputs connected to the associated m outputs of said multi-string sort array and q outputs. The buffer includes m×q memory units, each of said units adapted to hold one data item. The feedback array sorter further includes a merge tree array having q leave nodes connected to the output of said first buffer memory, and an output from the root node; p−1 buffer memory modules in feedback loops each module having an input connected with output of said merge tree array and q outputs connected to said q leave nodes of said merge tree array; and a multiplexor for controlling the filling from said first buffer and p−1 memory buffers electrically connected to the inputs to said merge tree.

9 Claims, 9 Drawing Sheets

$X_{OUT} = \text{Max}\{X_{in}, Y_{in}\}$
$Y_{OUT} = \text{Min}\{X_{in}, Y_{in}\}$

PIPELINE FEEDBACK ARRAY SORTER WITH MULTI-STRING SORT ARRAY AND MERGE TREE ARRAY

FIELD OF THE INVENTION

The present invention relates to a high performance, low cost array sorter which is independent of problem size and consists of a multi-string sort array and a merge tree with feedback through sharable external buffer memory with virtual multiports. With the addition of prefilters and postfilters, this sorter also performs basic relational database operations at high speed.

BACKGROUND OF THE INVENTION

In most computations, sorting of data is a dominant procedure. It has been estimated that virtually every important aspect of programming includes sorting and searching. In database applications, sorting is one of the main operations. Computer manufacturers have estimated that a significant percent of the run time of a computer is spent in sorting.

Accordingly, numerous hardware sorting algorithms have been proposed to increase speed of sorting. Particular attention has recently been directed to the new VLSI (very large scale integration) technology for sorting applications. VLSI technology permits a large number of devices to fit on a single chip. Algorithms which provide high throughput are necessary to take advantage of the VLSI technology as it relates to sorting.

A number of papers have been written describing algorithms based on systolic arrays, including:

Carey, M. J. Hansen, P. M., and Thompson, C. D., "RESST: A VLSI Implementation of a Record Sorting Stack," Tech. Report UCB/CSD 82/102, Computer Science Division, Univ. of California, Berkeley (April, 1979).

Kung, H. T., "Why Systolic Architectures?" *Computer Magazine* Vol. 15(1), pp. 37–46 (January 1982).

Leiserson, C. E., "Systolic Priority Queues," Tech. Report CMU-CS-79-115, CMU Computer Science Department (April, 1979).

Song, S. W., "On a High-Performance VLSI Solution to Database Problems," Tech. Report CMU-CS-81-142, CMU Computer Science Department (August, 1981).

Watanabe, I., "VLSI Implementation of Odd-Even Sorter Using a Uniform Ladder," Tech. Report Tr 85, Department of Computer Science, Univ. of Rechester (November, 1981).

Carey et al discloses a VLSI implementation of a record sorting stack which is essentially a linear array version of the classic bubble sort algorithm. Leiserson discloses a systolic priority queue which is a sorter based on bubble sort. Song discloses a systolic tree device and shows that the tree device disclosed therein and Leiserson's priority queue can perform sorting in optimum time. Watanabe, on the other hand, discloses a systolic VLSI implementation of odd-even sorter, a type of bitonic sorting network, using the uniform ladder such as proposed by Chen et al in Chen, T. C., Eswaran, K. P., Lum, V. Y., and Tung, C., "Simplified Odd-Even Sort Using Multiple Shift-Register Loops," *International Journal of Computer and Information Science* Vol. 17(3) (1978).

However, it is understood that bitonic sorting algorithms have better average computing speed, but are more complicated to be implemented in hardware, and almost impossible to be independent of the problem size.

The VLSI sort arrays discussed above all require $O(V)^*$ time to sort, where V is the number of items to be sorted. However, these devices require at least $O(V)$ array cells so that when V is large, such devices are impractical, particularly since V varies from problem to problem. Breaking large sets of items into smaller sets and sorting each of the smaller sets by a sorting device of size S to be merged by multi-way sort increases the practicability but also increases the time complexity to $$O\left(\frac{V \log V}{\log S}\right)$$

which may be too large when V is very large compared to S.

*$O(V)$ means order of V.

A measure of efficiency for comparing different parallel sorters has been suggested in Winslow, L. E. and Chow, Y., "The Analysis and Design of Some New Sorting Machines," *IEEE TRANSACTIONS ON COMPUTERS* Vol. C-32(7), pp. 667–683 (July, 1983)

based on the input or the output being sequential or parallel. Their efficiency measure, however, does not take into account the complexity of the basic sorting element and the time required to perform each of the atomic steps.

Accordingly, it is an object of the present invention to provide a sorting array which utilizes a minimum of cells and which is both practicable and flexible. It is also an object of the present invention to provide a sorting array which can provide relational database operations by the addition of pre- and post filters because sorting is a dominant operation in database operations.

SUMMARY OF THE INVENTION

The present invention provides an array sorter which requires $$\left(1 + \frac{1}{2p}\right)\left(\frac{V}{m}\right)^{\frac{1}{p}}$$

internal cells, where
  m is the number of data strings or width of the multi-string sort array;
  q is the number of leaves on the merge tree;
  $V = mq^p$ is the number of data items to be sorted; and
  p is the number of external buffer memory modules Generally, the feedback array sorter of the present invention comprises a multi-string sort array having m inputs and m outputs and a binary merge tree having q leave nodes and an output from the root node. p buffer memory modules are used in which the first buffer memory has m inputs connected to the m outputs of the multi-string sort array and has q outputs associated as the inputs to the leave nodes of the merge tree.

The first buffer memory contains $m \times q$ memory units in which each unit holds one data-item. The remaining $p-1$ buffer memory modules each have an input connected to the root node output of the merge tree array. Each of the p−1 buffer memory modules has q outputs connected as a feedback to the q leave nodes of the merge tree array.

A multiplexer for controlling the flow of data items from the p buffer modules into the merge tree is provided.

To provide unary and binary relational database operations, a prefilter is used ahead of the sort array and post-filters on the output from the root node of the merge tree to perform JOIN, INTERSECTION, DIFFERENCE and UNION operations thereon.

The present invention provides an array system for sorting and relational database operations which is preferably implemented on VLSI chips. The number of cells required is not large and does not grow in size with the size of the number of data items to be sorted and is, thus, practical and flexible. Further, it has sorting speeds comparable with known sorting arrays, but at a much lower hardware cost. In addition to sorting, the array of the invention can provide database operations at sorting speeds. Other advantages of the present invention will become apparent from a perusal of the following detailed description of a presently preferred embodiment of the invention taken in connection with the accompanying drawings.

BRIEF DESCRIPTION OF THE DRAWINGS

FIG. 12 shows the logic of a prefilter; FIG. 13 the post-filter for intersection, union and difference operations, and FIG. 14 the postfilter for the join operation.

PRESENTLY PREFERRED EMBODIMENT

Figure 1:
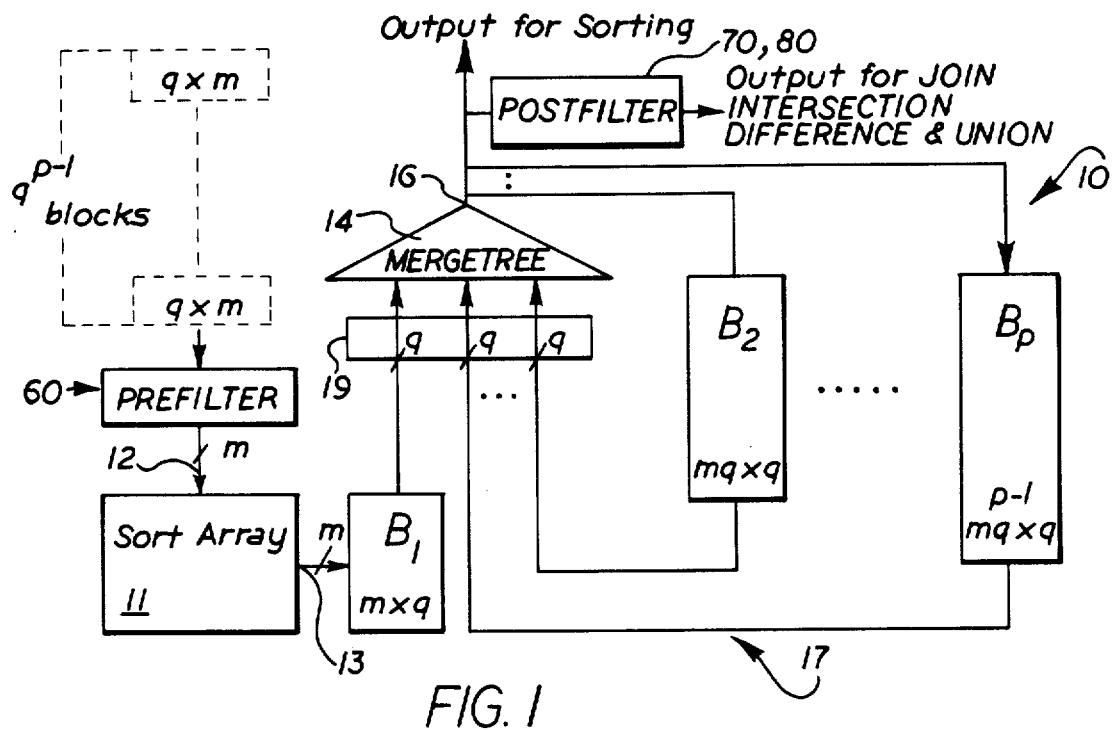
FIG. 1 is a block diagram of the sorting array of the present invention havng both a pre- and post filter for database operations.

With reference to FIG. 1, feedback sorter 10 comprises a multistring sort array 11 having m inputs 12 and m outputs 13. Preferably, sort array 11 utilizes a bubble sort algorithm for sorting by recursively scanning to find the largest item so that m-1 scans are needed to transform a string of data into a string of sorted data.

Preferably, a "find-the-largest" scan is implemented by a linear systolic array in each row of sort array 11 on which each successive scan reduces the string by one. All of the linear arrays are vertically cascaded to form a triangular array as described in more detail hereinafter. Feedback sorter 10 includes binary merge tree array 14 having q leave nodes at its input level and a "root" node at output 16. The input leave nodes are connected to the outputs of p buffer memory modules 17, through multiplexer 18. Buffer $B_1$ has m data inputs from output 13 of sorter 11 and q outputs to the q/2 leave nodes of merge tree 14. The remaining p−1 buffers $B_2 \ldots B_p$ have inputs from merge tree output 16 and q outputs to feed back to merge tree 14, through multiplexer 19.

Sorter array 10 implements an algorithm that sorts m input strings and merges the sorted strings repeatedly into a single sorted string.

To better understand the algorithm, consider m strings of data $[D_{11}, D_{12}, \ldots, D_{1N_1}]$, $[D_{21}, D_{22}, \ldots, D_{2N_2}], \ldots, [D_{m1}, D_{m2}, \ldots, D_{mN_M}]$, where each $D_{ij}$ has a key $K_{ij}$. Let $$N = \max(N_1, \ldots, N_m),$$

and define a matrix M of keys as $$M = \begin{bmatrix} K_{11} & \cdots & K_{1N} \\ \cdot & \cdots & \\ \cdot & \cdots & \\ \cdot & \cdots & \\ K_{m1} & \cdots & K_{mN} \end{bmatrix} = \begin{bmatrix} S_1 \\ \cdot \\ \cdot \\ \cdot \\ S_m \end{bmatrix}$$

Each of the added elements, i.e. the elements of M which are not keys of data items, assumes a dummy value equal to the minimum value that the machine can represent. Feedback sorter 10, therefore, implements an algorithm $T_M$ that sorts m input strings $S_1, S_2, \ldots, S_m$ corresponding to the rows of M and merges them into a single sorted string $S = K_1, K_2, \ldots, K_{mN}$ such that $$T_M(S_1, S_2, \ldots, S_m) = S = (K_1, K_2, \ldots, K_{mN}),$$

where $$K_1 \geq K_2 \geq \ldots \geq K_{mN}.$$

M is broken into $q^{p-1}$ m×q submatrices, where p and q are positive integers, such that $$M = [M(1), M(2), \ldots, M(q^{p-1})]$$

where $$M(r) = \begin{bmatrix} S_1(r) \\ S_2(r) \\ \cdot \\ \cdot \\ \cdot \\ S_m(r) \end{bmatrix} = [K_{ij}(r)],$$

$$r = 1, 2, \ldots, q^{p-1}; i = 1, \ldots, m; j = 1, \ldots, q$$

When N is not divisible by $q^{p-1}$, dummy items carrying the minimum value can be added to make it divisible.

The $q^{p-1}$ submatrices or blocks, as shown in FIG. 1 form a continuous flow of $q^{p-1}$ data blocks, each having width m and length q, and enter sort array 11 one by one. In cases where the number of strings is less than that of input ports 12 of the sort array 11, some of the strings can be directed int more than input port, or the dummy values can be directed into the unused ports. The function of the sort array 11 is to sort blocks M(r) column by column, generating blocks each having q sorted columns of length m and identified as $M^1(r_1)$, where $r_1$ and r denote the same block index. Namely, $$A(M(r)) = M^1(r_1) = [K^1_{ij}(r_1)]$$

where A(M(r)) identifies the transformation on M(r) by sorter 11. The elements of the j-th column of $M^1(r_1)$ are produced by sorting the j-th column of M(r) so that:

$$K^1_{ij}(r_1) \geq \ldots \geq K^1_{mj}(r_1),$$

where $$j = 1, \ldots, q; r_1 = 1, \ldots, q^{p-1}.$$

Outputs 13 from the sort array 11 are stored directly in first level buffer memory $B_1$ of Modules 17, while sort array 11 is processing the block. After sorting block M(r), the resulting sorted block $M^1(r_1)$ is stored in buffer $B_1$. Sort array 11 stops and waits for the q columns of $B_1$ to be merged into a stored string of length $m \times q$ by the merge tree 14. The merged string is dumped into a column of second level buffer memory $B_2$. After processing q blocks, buffer $B_2$ which has a $mq \times q$ memory capacity, will be filled. At the time $B_2$ is filled, it is considered to hold $M^2(r_2) = K^2_{ij}(r_2)]$, $r_2 = 1, 2, \ldots, q^{p-2}$. Namely, for $r_2 = 1$ $$M^2(r_2) = [K^2_{ij}(r_2)] = [T(M^1)(1), \ldots, T(M^1(q))]$$

where $K^2ij(r_2)$, $i = 1, \ldots, mq$, belong to $M^1(j)$, $j = 1, \ldots, q$, and $T(M^1(j))$ denotes a transformation on $M^1(j)$ by merge tree 14, and $$K^2_{1,j} \geq K^2_{2,j} \geq \ldots \geq K^2_{mq,j}.$$

In this way, feedback sorter 10 sorts a block column-wise by sort array 11 to fill buffer $B_1$; merges columns of buffer $B_1$ by merge tree 14 to fill a column of buffer $B_2$; and so on. By merging the columns of $B_p$, the final sorted string S is obtained from output 16 of the root node of merge tree 14.

a. Sort Array:

In order to carry out the multi-string sort by sort array 11, it is preferred to utilize a bubble sort triangular array. As set forth above, the bubble sort algorithm performs sorting by applying the Find-the-Largest scan recursively, i.e., the first scan picks out the largest, the second picks out the second largest and so on. During each scan two consecutive items are compared and, if out of order, they are interchanged. The first scan scans all of the elements and the next scan scans one less element, and the last scan scans only two elements. Consequently, $m-1$ scans are needed to transform column M(r) into a column of $M^1(r_1)$.

Figure 2A:
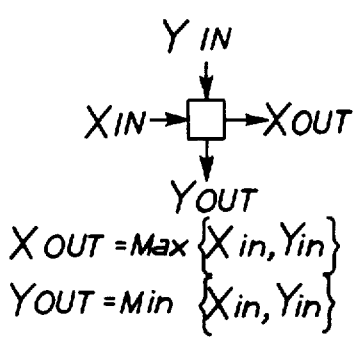
FIGS. 2a and 2b illustrate a multi-string bubble sort triangular array used in sorter 11.
Figure 2B:
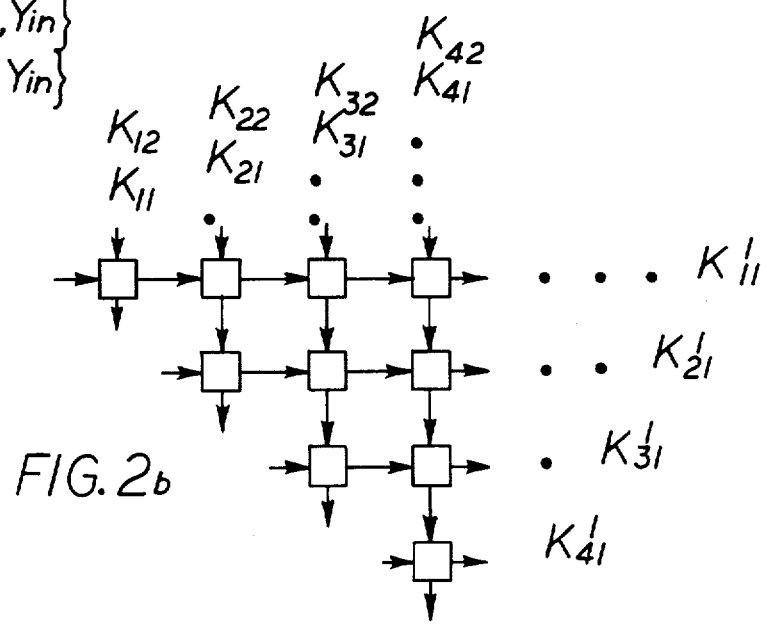

Each cell in sort array 11 (described hereinafter) has a vertical input Yin and horizontal input Xin as shown in FIG. 2a. These cells are connected to form linear array which perform "select the largest" operation. By cascading all of the linear arrays vertically, a triangular array is formed as shown in FIG. 2b wherein the larger of the two inputs flows to the right to be compared with the next element in a current scan, and the smaller element flows downward to be compared in the next scan. The horizontal input of a cell 20 on i-th row corresponds to the largest element scanned to that point to the left in the i-th scan. It is necessary to stagger the input so that the largest element found in a scan will meet a another element at the right cell at the right time. It has been found that to determine the largest item in a column of length m, a linear array of length $m-1$ is sufficient. Preferably, however, an extra cell is positioned to the left end of each row to form the diagonal border of the triangular array as shown in FIG. 2b for structural regularity and array synchronization.

The total number of cells 20 in preferred sort array 11 is $m(m+1)/2$. Normally the cells on the diagonal boarder are fed horizontally with dummy values. By inputing a lower limit instead of the dummy value, these cells can be used as limiters to discard any items less than the lower limit. Preferably, all the cells of sort array 11 are identical, although cells on the diagonal border can be made simpler.

Figure 3:
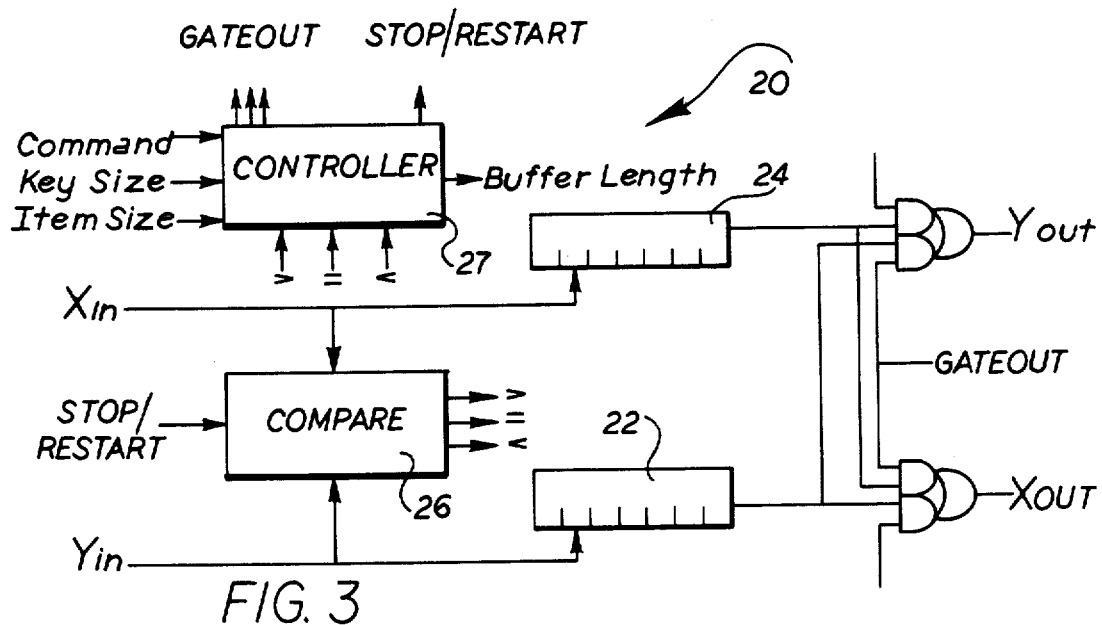
FIG. 3 is a diagrammatic illustration of the internal logic of a cell of sort array 11.

With reference to FIG. 3, a general schematic of cell 20 of sort array 11 is shown. For purposes of generality the following description of the cell logic supposes that each data item to be sorted has two fields, a key and a pointer and that both fields consist of a string of characters. Data strings enter the cells of sort array 11 character by character, and each cell 20 compares the keys and moves the data items to the proper output terminal. Each cell 20 has two internal buffer registers 22 and 24, respectively. Each internal register is long enough to hold the longest keys allowed in the system.

As shown in FIG. 3, each sort array cell 20 has two inputs, Xin and Yin, and two outputs, Xout and Yout, each with an I/O width of preferably one byte. Compare unit 26 is a byte parallel comparator which compares the input character pairs one by one. As the first pair of characters enter, a "restart" signal from controller 27 starts the operation of the compare unit 26. During the comparison process, this unit generates a signal on the $>$ output, the $<$ output, or a series of signals on the $=$ output. As soon as a signal appears on the $<$ or the $>$ output, or all the characters of the key have passed through unit 26, controller 27 inside cell 20 will stop the comparison process and guide the two data items by the gateout signal to the proper output terminal. When the next pair of items arrive, the comparison will be restarted. According to the different sorting requirements (or for other operations), the control sequence can be modified by entering different commands to controller 27. Each of the two buffer registers 22 and 24 is used for storing the processed portion of a data item.

Figure 4:
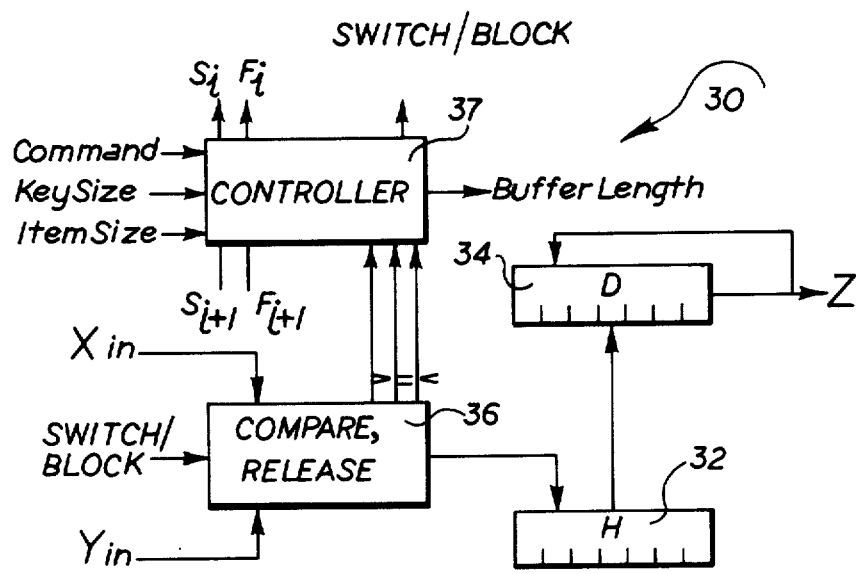
FIG. 4 is a diagrammatic illustration of the internal logic of a cell of merger tree 14 shown in FIG. 1.

In the preferred embodiment the key size and the item size of the data items are preset. For a given problem, all cells 20 are preset to the same key size and item size, but the key size can be set to be smaller than the real one. In this latter case only the leading parts of the keys will be compared, and the remaining parts will be neglected and treated as if they were a part of the pointers.

b. Merge Tree:

With reference to FIG. 4, cell 30 of merge tree 14 is schematically shown. Each cell 20 has two shift registers 32 and 34 which form a twin. Register 32 is called the holding register and further designated by the letter "H". It holds the characters from the item with larger key. Register 34 is called the delivery register and is further identified by the letter "D". It transfers the larger item to a cell 30 on the next higher level. Register 34 is a recycling shift register. As a pair of characters from inputs $X_{in}$ and $Y_{in}$ enter the Compare and Release unit 36, a signal is generated in the $=$, $>$, or $<$ terminal. A $=$ signal will cause the character from $X_{in}$ to be shifted into register 32(H). As soon as the first $>$ signal occurs, all of the remaining part of the data item from $X_{in}$ will be released to register 32 (H). On the other hand, the first $<$ signal will cause the remaining part of $Y_{in}$ to be released to register 32 (H). In any case, register 32 always stores the characters coming from the data item with larger key.

After completing the key comparison if $X \geq Y$ controller 37 will set $CS=1$ and $CY=0$, which means X input is allowed to pass through the node to the next level and Y input is blocked as described hereinafter. If $X<Y$, it will set $CX=0$, and $CY=1$, which blocks X and passes Y.

Figure 5A:
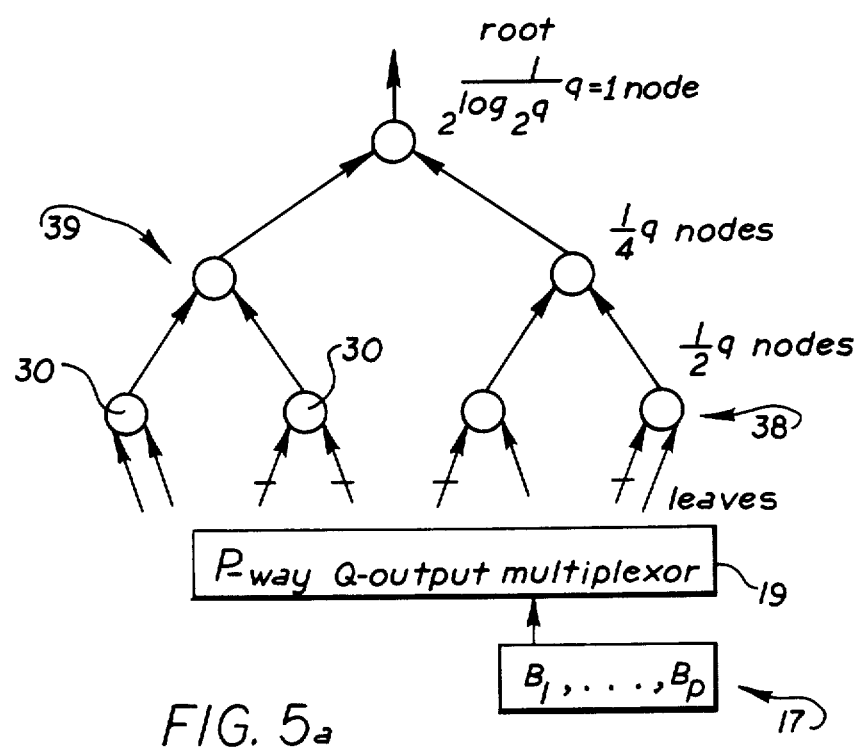
FIGS. 5a and 5b are schematics of the binary merge tree 14 and the internal connections between registers shown in FIG. 4.
Figure 5B:
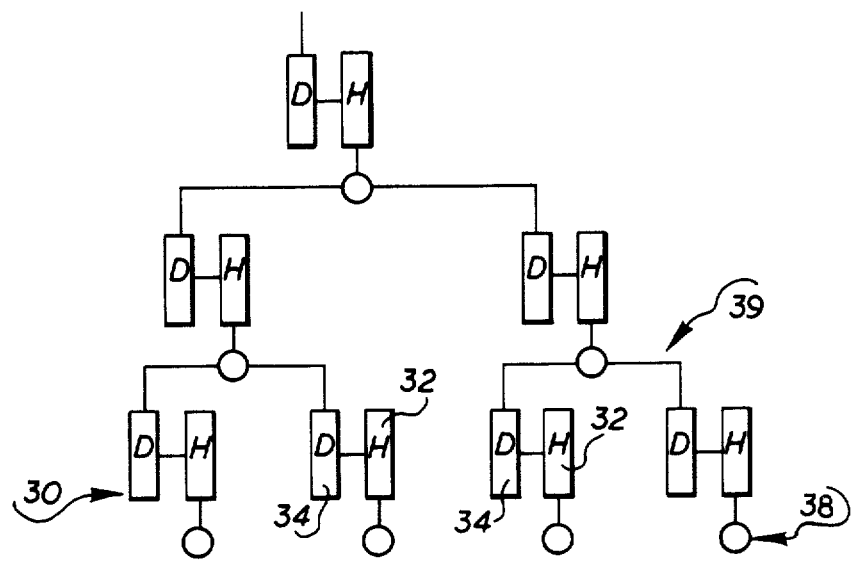

Cells 30 of merger tree 14 are arranged as a binary tree array as generally shown in FIG. 5a and FIG. 5b. With reference to FIG. 5a, the function of each tree cell 30 (node) is to pick out the larger of two input data items as described above. In each node the data items flow upwardly towards the root 16. In the first step, all nodes on the bottom level 38 (leave nodes) "push up" q/2 items through register 34 from a buffer memory 17. In the second step, nodes 39 on the next to bottom level pick out q/4 items and "push" them upward through registers 34. In the same way, in the $\log_2 q$-th step the largest item is pushed out from the root node to output 16. Thereafter, a steady stream of sorted data flows out from root 16 of the tree 14. After merging q columns of $B^i$ into one column of $B_{i+1}$, the process of merging and filling is repeated q times until all q columns of buffer $B_{i+1}$ are filled. Then $B_{i+1}$ becomes the input buffer and $B_{i+2}$ the output buffer in the next phase of the merging process. Since the p buffer memories 17 serve as input buffers in turn, a multiplexor 19 [FIG. 1] is used in the input to merge tree 14.

Figure 6:
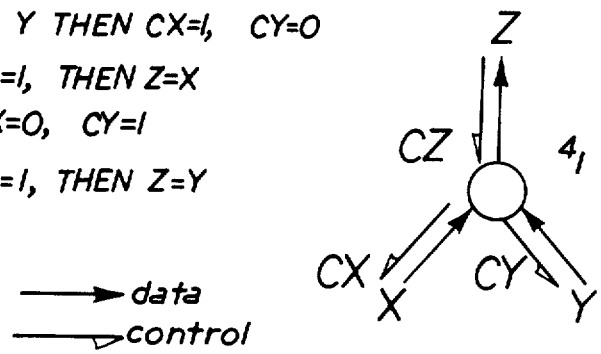
FIG. 6 schematically depicts the function of a merge tree cell.

To avoid occurrence of traffic jams on the upper levels of tree 14, some of the nodes on the lower levels must be idle. To control whether a node should be idle or active, control bits 41 are caused to flow downwardly from root 16 as shown in FIG. 6, which shows the cell function of merge tree 14. However, before the tree starts merging, all of the control bits 41 are preset to true (value 1). Therefore, the operation in the merge tree is asynchronous (or self-timed).

From bottom nodes 38 to the root 16, the number of nodes on each level is reduced by half. Therefore, the total number of nodes in tree 14 is $$q/2 + q/4 + \ldots + \frac{q}{2\log_2 q} = q + 1$$

The total number of steps needed to merge one M ($r_i$) stored in buffer $B_i$ is $mq^i + \log_2 q$.

By connecting cells 30 in a binary tree, a tree of twin registers results in which each node, except for the leave nodes 38 has a twin for each input and a twin for the output as shown in FIG. 5b. For a successor node to push up an item, not only the corresponding control bit 41 (CX or CY) has to be 1, but also the ancestor node should be capable of accepting it (CZ=1) as indicated in FIG. 6.

Figure 7:
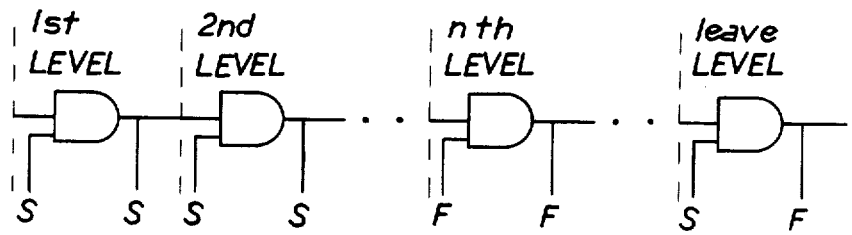
FIG. 7 illustrates the passing state of a chain of nodes in merge tree 14.

To understand how this can be determined, consider a path in tree 14 as shown in FIG. 7. After comparing a pair of keys, each input (e.g., the X input) branch of a node will have its own passing state: success state S (i.e., CX=1) or fail state F (i.e., CX=0). Along a path connecting all the branches from the root to one of the leaves, there will be a passing state chain as shown in FIG. 7. The passing state of each branch is updated by ANDing the ancestor's state and its own state. Since the updated state of each branch determines if the item in it can be pushed upward, it is easy to see that only when all the branches in the path assume the S state, an item can be pushed up.

Since the key field of each item always moves ahead of its pointer, when the key comparison completes, the passing states of all branches in the path will be set and the pointer can pass through. After the item with larger key is completely stored in register 32 (H), it will be transferred to register 34 (D) parallelly when the updated passing state is S. The item transferred to register 34 (D) is pushed up character by character. Since register 34, is preferaby a recycling shift register, it recycles the original data item through feedback inside the node. Only the item coming from one of the immediate successors and being held in register 32 (H) can replace the contents of register 34 (D). At the successive levels of tree 14, comparison and "pushing-up" of the data items are performed concurrently in pipeline fashion, character by character. Since data items do not flow back in the tree, merge tree 14 does not encounter the problems as the prior art, e.g. the tree disclosed by Song, supra, due to its two directional data flow.

Since the leave nodes of the tree are connected to the buffer memory $B_i$, there are no recycling shift registers in their input sides. Therefore, interface between $B_i$ and tree 14 is desirable. Here, the passing state can be used to determine the address for memory access. For example, state S leads to access from location $A+1$ and state F leads to access from location $A+1-L$, where A is the address of the character most recently fetched, and L is the length of the item.

c. Memory Buffers

Figure 8:
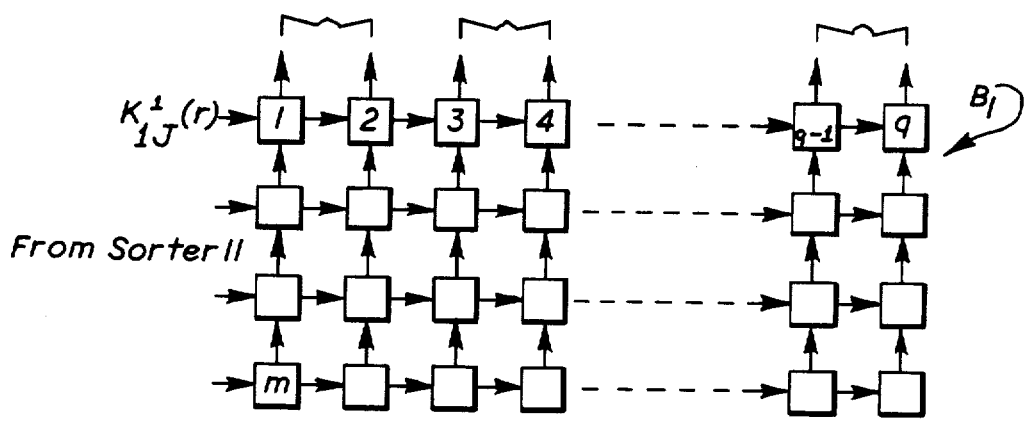
FIG. 8 illustrates the 1st buffer memory module $B_1$.

Referring to FIG. 1, p buffer memory modules 17 are required. The first level buffer memory $B_1$ is connected to the output of multi-string sort array 11 and requires two dimensional data movements, i.e., writing in rows and reading in columns. Buffer $B_1$ has $m \times q$ memory units, each holding one data item. Since sorting in sort array 11 and the filling of $B_1$ are pipelined, $B_1$ will be filled in $2m+q-2$ steps after data start entering the triangular sort array 11. As soon as the row filling is completed, $B_1$ is switched to a column-pop-up mode. All the elements of $M^1(r_1)$, stored in $B_1$, are arranged column by column waiting to be pushed upwards for merging by merge tree 14. The elements in the columns are "pushed up" asynchronously depending on the status of merge tree 14 to which $B_1$ is outputed and the key values of the top items in the columns. Referring to FIG. 8, structure of the first level buffer memory $B_1$ is depicted in which data move is horizontal and vertical. However, because the input data coming from sort array 11 are skewed, a memory with only one dimensional data movement can be used to implement $B_1$.

Figure 9:
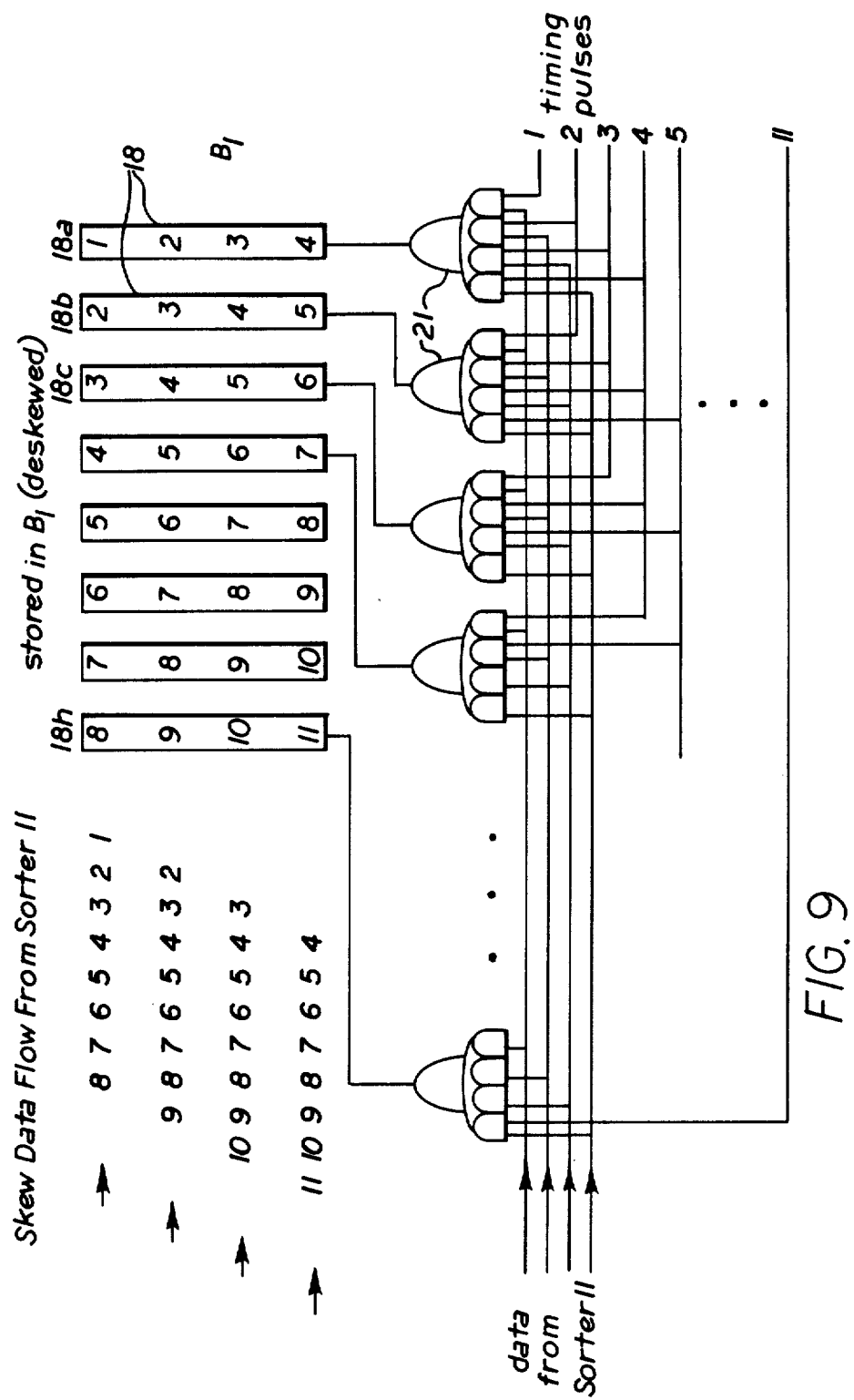
FIG. 9 depicts an example of the interface between sort array 11 and buffer module $B_1$.

To understand how $B_1$ works, refer to FIG. 9 which illustrates $B_1$ having a size $m \times q = 4 \times 8$ which consists of q columns of memory 18 each preferably a normal RAM module. Each module accepts m data items from m different output terminals of sort array 11 via and AND-OR gate 21 (called deskew gate) at different clock times. At the first clock, only one item comes out from sort array 11, and it is written into the top of the first column 18a of $B_1$. At the second clock pulse, two items come out of sort array 11 and they are stored in the first and second columns 18a and 18b by the associated deskew gates 21 and/or 21b. Finally, at the 11-th clock pulse the last item is loaded into the bottom of 8-th columm 18h and $B_1$ is full. The numbers in the respective columns of FIG. 9 represent the various clock pulses.

Figure 10:
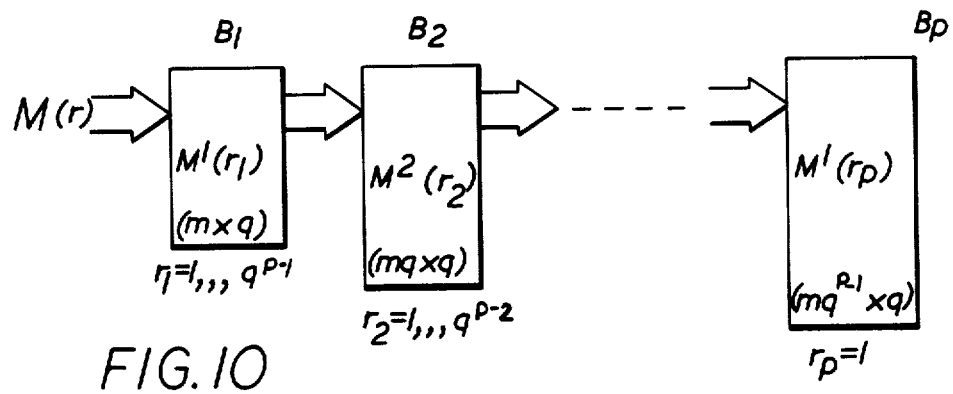
FIG. 10 illustrates the relationships between various memory buffer modules.

All other buffer memories of 17, i.e., $B_2$, $B_3$, ..., $B_p$, have only one dimensional data movement. Output data string from the root 16 of merge tree 14 enters a buffer memory, column by column, through one input port. During the merging process, data items in the columns are popped out through q output ports, as with $B_1$. The relationship between the levels of buffer memory can be viewed as cascading amplifiers with an amplifying factor q between successive levels. Thus, each column of $B_{i+1}$ is q times longer than that of $B_i$ as shown in FIG. 10.

In the present invention the buffer memories need not be special purpose storage devices, such as shift registers or even separate storages. Preferably, they are random access memory (RAM) or parts of a RAM. Moreover, some of them can be overlapped because they are not all used at the same time. q DMA controllers may be used to speed-up data communication with merge tree 14 and to update addresses.

Figure 11:
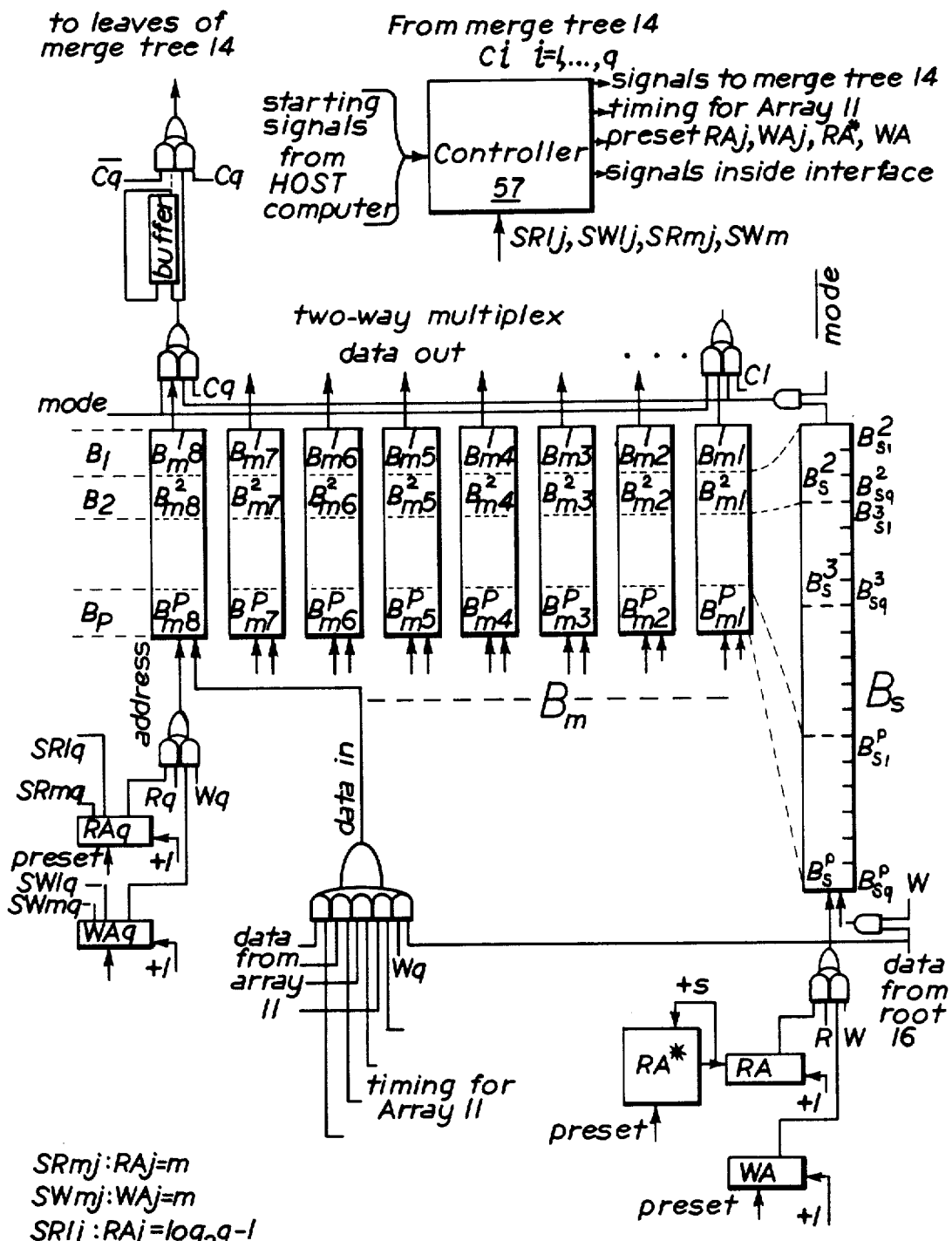
FIG. 11 shows the preferred detailed interface between all buffers and sort array 11 and merge tree 14 (virtual multi-port memory)

In principle, all $B_i$, where $i=1, \ldots, p$, are required to be q-ported memories. However, in practice, only one small q-port memory needs to be used with a large single-port memory to implement the p q-port memories. For example, during a merging phase, multiple inputs to merge tree 14 occur only in the first $\log_2 q'1$ steps. Therefore, each buffer memory can be divided into two parts as shown in FIG. 11. One part of $B_i$, denoted as $B^i_m$, consisting of q single-port memory modules $B^i_{m1}$, $B^i_{m2}$, ..., $B^i_{mq}$ each with a capacity of $\log_2 q - 1$ items, is in the multi-port memory $B_m$. The other part, $B^i_s$, with a capacity of $mq^{I-1} - \log_2 q + 1$ items, is in the single-port memory $B_s$. With $m < \log_2 q - 1$, $B_1$ has a multiport part only because in practice $q >> m$. $B_m$ consisting of all the $B^i_m$'s has a capacity of $(m+(p-1)(\log_2 q - 1)) \times q$ items, and $B_s$ consisting of all the $B^i_s$'s has a capacity of $$\sum_{i=2}^{p} mq^i$$

items. Each of the q+1 memory modules ($B_{m1}$, $B_{m2}$, ..., $B_{mq}$ and $B_s$) has two address counters, RAj (or RA) for reading and WAj (or WA) for writing. RAj and WAj are $\log_2 (m+(p-1) \log_2 q)$ bit long, and RA or WA are $\log_2$ $$\left( \sum_{2}^{p} mq^i \right)$$

bit long.

The $B^i_{mj}$, where $i=1, \ldots, p$; $j=1, \ldots, q$ and the $B^i_s$, $i=2, \ldots, p$, have separate address spaces. Each $B^i_{mj}$, where $j=1, \ldots, q$, has the address spaces as shown in the following table.

| i | startng address | endng address |
|---|---|---|
| 1 | 0 | m − 1 |
| 2 | m | m + log₂q − 1 |
| 3 | m + log₂q | m + 2(log₂q − 1) |
| ... | ... | ... |
| p | m + (p − 2)log₂q | m + (p − 1)(log₂q − 1) |

The $B^i_s$'s have the following address spaces:

| i | starting address | ending address |
|---|---|---|
| 2 | 0 | $mq^2 - 1$ |
| 3 | $mq^2$ | $mq^2 + mq^3 - 1$ |
| ... | ... | ... |
| p | $\sum_{2}^{p-1} mq^i$ | $\sum_{2}^{p} mq^i$ |

Each $B^i_s$ is further subdivided into q sections $B^i_{sj}$, where $j=1, \ldots, q$. Before the beginning of the phase of merging in which q columns of $B_i$ are merged into the k-th column of $B_{i+1}$ controller 51 presets the address counters as follows:

$$RAj(1) = 0 \quad i = 1; j = 1, \ldots, q$$
$$RAj(i) = m + (i - 2)\log_2 q \quad i \geq 2; j = 1, \ldots, q$$
$$WAj(1) = 0 \quad i = 1; j = 1, \ldots, q$$
$$WAj(i) = m + (i - 2)\log_2 q \quad i \geq 2; j = 1, \ldots, q$$

$$RA(i) = \sum_{n=2}^{i-1} mq^n + (j - 1)mq^{i-1} + \log_2 q \quad i \geq 2; j = 1, \ldots, q$$

$$WA(i) = \sum_{n=2}^{i-1} mq^n + (j - 1)mq^i + \log_2 q \quad i \geq 2; j = 1, \ldots, q$$

Because writing is always columnar after column, only one initial address is needed to reset WA in each phase of merging. When WAj(i+1) reaches the count $$WAj(i+1) = m + i(\log_2 q - 1)$$

the write address counting will switch from $WA_j$ to WA. In FIG. 11 the signal SWIj signals the occurence of the condition $$WAj = m \bmod (\log_2 q - 1).$$

From this point on in the phase, writing into $B_m$ is switched off and writing into $B_s$ is switched on.

Reading is more complicated because within a phase of merging input data can come from any of the q columns. Whenever an RAj, where $j=1, \ldots, q$, reaches the count $$RAj(i) = m + (i - 1)(\log_2 q - 1)$$

an initial value for RA must be available immediately. So q such values need to be ready before each phase of merging. A small high speed memory, denoted as RA*, is preferred to hold them. As the condition $$RAj = m \bmod (\log_2 q - 1)$$

occurs and the control bit $C_j$ from merge tree 14 equals 1, the read address counting will switch from RAj to RA by pushing out an initial address from RA* into RA. As soon as an address in the RA* is pushed out, the address is updated by adding the item size s to it.

In FIG. 11, a two-way multiplexor, controlled by the single/multiple-port mode, combines the output of the single-port memory with the output of the q-port memory. Between a leaf of merge tree 14 and the output of the corresponding multiplexor, there is a recycling register simulating the D buffer register 34. The interface controller receives the starting signal from the host computer, the control bits Ci's from merge tree 14, and the internal signals from the address counters, RAj and WAj. It produces control signals to merge tree 14, timing signals to sorter 11, control signals inside the interface, and initial addresses (preset) to RAj, WAj, RA* and WA.

In this way, q small and one large single-port memories are used to create p virtual multi-port memories.

d. reduced cell number:

As stated above, the buffer memory modules 17 can be implemented in RAM and, thus, are sharable resources. Moreover, the total memory size, which is approximately $$\frac{q}{q-1} V,$$

is not a function of the system parameters m and q. On the other hand, the number of the more complicated and more expensive cells 20 and 30 in array 11 and merge tree 14, respectively, are functions of the system parameters.

Generally, the total number of cells in sort array 11 and merge tree 14, combined, is $$S_c = \tfrac{1}{2} m(m+1) + 1 - 1$$

To sort a collection of V data items with minimal hardware and without compromising sorting time, it is necessary to find the minimum value of $S_c$ under the condition.

$$V = mq^p.$$

By substituting q from above and letting $$\frac{ds_c}{dm} = 0$$

with V and p invariant, then $q/p = m^2 + m/2$. However, because in practice $m^2 >> m$ the equation reduces to $$q = pm^2.$$

Therefore, the minimal number of cells required under above condition, $$S_c = \left(1 + \frac{1}{2p}\right)\left(\frac{V}{m}\right)^{1/p}.$$

An advantage of the present invention using feedback buffers 17 is reflected in the ratio $V/S_c$ which represents the average number of items sorted by each cell in a system of the present invention with $S_c$ cells. For the system described with respect to FIG. 1:

$$\frac{V}{S_c} = \frac{mq^p}{\tfrac{1}{2}(m^2 + m) + q - 1} \text{ or } O\left(\frac{2p}{1+2p} \frac{V}{q}\right)$$

As can be seen, the ratio $V/S_c$ grows very rapidly as p increases. Thus, the p-level buffering of the present invention provides a reduction in the number of cells by $$\frac{V}{q} = mq^{p-1}$$

times. Table 1 below illustrates this, where the second row of the table shows that approximately 1 million items can be sorted with only 375 cells. In other sort arrays of the prior art, about 1 millions cells would be required, but those array would operate about two times faster.

TABLE 1

| P | m | q | V = mq | Sc | V/Sc |
|---|---|---|--------|-----|------|
| 1 | 50 | 2,048 | 102,400 | 3,322 | 30.8 |
| 2 | 12 | 256 | 983,040 | 375 | 2,621.4 |
| 3 | 5 | 64 | 1,310,720 | 78 | 16,804.1 |
| 4 | 3 | 32 | 3,145,728 | 37 | 85,019.7 |
| 5 | 2 | 16 | 2,097,152 | 16 | 116,508.4 | e. Relational Database Operations:

As stated above, one of the objects of the present invention is to provide sorter 10 with the capability of performing relational database operations.

Figure 12:
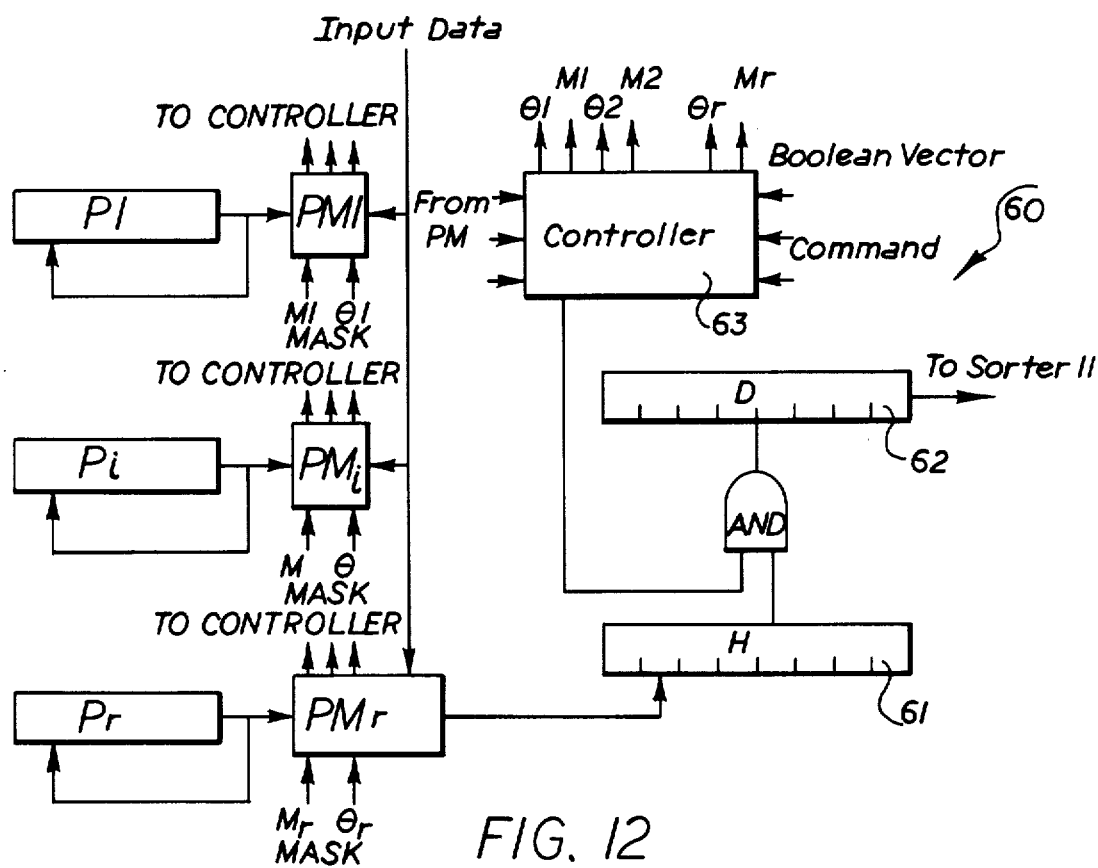
FIGS. 12, 13 and 14 depict the logic of prefilter/postfilter used with sorting array 10 to provide relational database operations.

For the select operation and flexibility in other operations, it is preferred that m prefilter cells 60 be put in front of the sort array 11 as shown in FIG. 1. The prefilter cells preferably have the logic structure as shown in FIG. 12.

Each prefilter 60 consists of a group of pattern registers $P_i$'s, a pair of output buffer registers 61 and 62 and a controller 63. All of the registers $P_i$ are recycling shift registers, which shift byte by byte. Each register $P_i$ stores a pattern which can be used to determine if a certain field in the key relates with it according to a certain relation. If so, a Boolean variable $b_j$, is set to 1. We can use a mask sequence $M_i$ to extract some field in the key and select items according to a given Boolean vector (or Boolean expression). Both the Boolean vector and the patterns are preset by the host computer. The mask sequences can be generated by the host computer or by the controller inside the cell.

For each register $P_i$ there is a one-byte programmable pattern matcher $PM_i$ which matches the field specified by mask $m_i$ with register $P_i$ according to a given relation $\theta_i$ sent from the controller 63 in response to a command from the host computer. In general, the PM's do not alter the items being matched. They are used only to find out if a certain field relates with a given pattern. However, in some applications, the PM's may be programmed to delete some fields, exchange two fields, substitute some field by a given pattern, or insert a tag or the like. As the key is being matched, the item is shifted into holding register 61(H). During the matching period, controller 63 checks the values of the Boolean signals indicating the results from the matching of the PM's. When register H is full, controller 63 determines if the contents of register 61 should be transferred to delivery register 62(D) according to whether the combination of the Boolean variables generated by the PM's satisfies the Boolean expression or not. If it satifies the expression, the item will be selected and transferred to register 62(D) for output. if it does not satisfy the expression, its key is replaced by a NULL or the item is discarded and not transfered to D.

If the selected items need not be sorted, the outputs of prefilters 60 are loaded back to the main memory of the host directly. If they need to be sorted, they are fed into the sort array 11. However, in this case the data flow will have numerous "filler" items with NULL key corresponding to items not selected. This will slow down the sorting process and waste the buffer memory. When there are more than one level of feedback, the filler items can be removed by the postfilter 70 located at the root 16 of the merge tree 14.

Unary Operations

The prefilter 60 cells together with sorter 10 can perform delete, insert, and project operations. The delete operation can be viewed as the complement of the select operation. In the delete operation, all the items satisfying a given condition are discarded before entering sort array 11 or being loaded back to memory of the host computer.

Feedback sorter 10 can be used to insert k groups of items into an ordered string. If the groups are unsorted, the first step is to sort them. Then break the ordered string into $q-k$ sections, fill them into $q-k$ columns of one of the $B_i$, and fill the k groups into the remaining k columns.

To project a collection of data items over a specified field of a key is to eliminate the non-specified fields from each item and remove the resulting duplicate items. The prefilter cells can be used to remove the non-specified fields of each item. The removal of duplicate items is achieved in three steps.

In step one, duplicate items in the same row of data entering the sort array 11 are detected. To do this cells 20 of sort array 11 are programmed or one of their control bits set so that each cell 20 performs the following function:

IF Xin ≠ Yin THEN Xout = max [Xin, Yin]
                  Yout = min [Xin, Yin]
IF Xin = Yin THEN Xout = Xin
                  Yout = NULL where NULL is the minimum key value representable by the machine. All the duplicate items excepting one will now carry the NULL key.

In step two, duplicate items not in the same row of data entering the sort array 11 are removed. This is done during the merge in merge tree 14. Duplicate items will be in different columns of $B_i$ for some i, and will meet at some node of the tree 14. Cells 30 of merge tree 14 are programmed as follows:

IF X > Y, THEN Z = X (set CX = 1, CY = 0)
IF X < Y, THEN Z = Y (set CX = 0, CY = 1)
IF X = Y, THEN Z = X (set CX = 1, CY = 1).

When both CX and CY are equal to 1, both input branches of the node will push their data items up. But since the node has only one output, only one of the two equal items will pass through.

In the third step, the items with the NULL key are removed in postfilter 70 attached to the root output 16.

Binary Operations

The database operations discussed so far are all unary relational database operations because they all have one relation as an argument. The basic binary set operations on relations are union, intersection, and difference. The union, $A \cup B$, of A and B is the collection of data items belonging to either A or B or both. The difference, $A-B$, of A and B, is the collection of items belonging to A but not to B. As for the intersection of A and B, $A \cap B$, it is the collection of items belonging to both A and B. In principle, no special processing is needed to obtain the union. We need only to put all items of A and all items of B together (except for the duplication which can be removed as explained before). However, all three operations and their combinations can be treated in a unified way. Suppose we have relations A and B, and the data items in the are a's and b's, respectively. All the a's and b's are fed into the sorting hardware and the project operation is conducted, without field removal, to remove all duplicate items. The prefilters are divided into two disjointed groups, and the a's and b's are fed to the separate groups. While the items flow through the prefilters 60, each of the a's is tagged with a tag byte $t_a$, and similarly to b's with $t_b$ where $$t_a > t_b.$$

Figure 13:
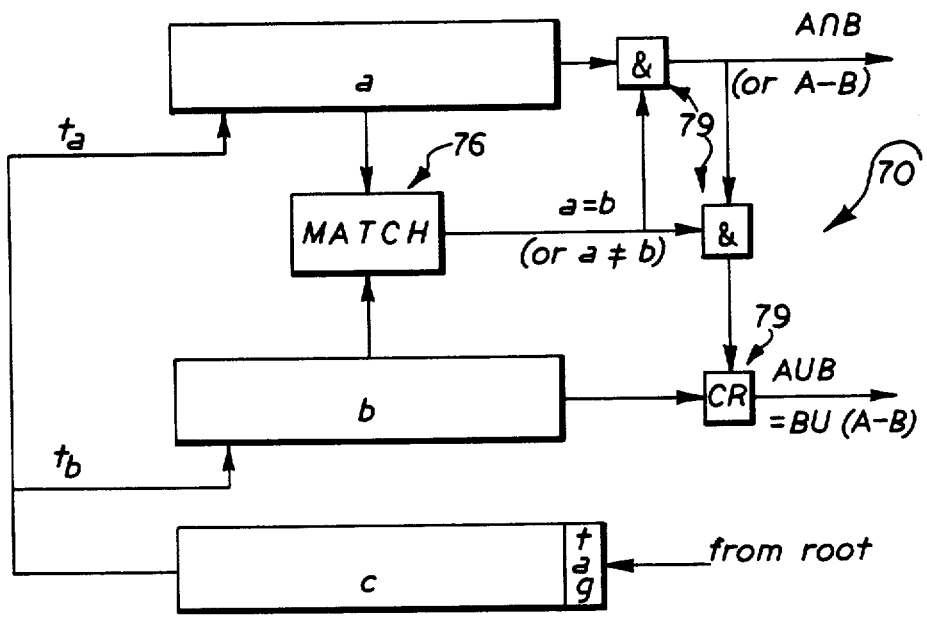

The tags $t_a$ and $t_b$ are concatenated to the least significant positions of the keys to form extended keys. After the project operation, we obtain a sorted string from the root 16 of the merge tree 14 which contains items in A and B with duplication within A or B removed (duplication across A and B still exist). Due to sorting, all the items having the same key but different tag bytes are gathered in consecutive positions in the output string. We now let the output string flows through the postfilter 70 of FIG. 13. Postfilter 70 consists of three registers a, b and c, a comparator 76 and a gate 79 controlled by the output S of the comparator. Register c temporarily stores an item. When the tag byte of the item arrives at c, the tag is used to guide the item to a or b register. If the switching variable S is set to 1 when a equals b, and when S=1 the gate releases contents of a, when the output string will be $A \cap B$. Conversely, if S is set S to 1 the a is not equal to b, then the output will be $A-B$. AUB can also be obtained by ORing B with $(A-B)$. It is easy to see that our postfilter 70 can be made to block items with NULL key. If b is loaded with NULL in the key field, then the output $(A-B)$ will contain items without NULL in the key. This scheme is also quite general in that, with more registers, more gates and more control variables inside the postfilter 70, many more relational operations including n-aryl relational operations and compound operations can be implemented.

The join operation on A and B generates a relation J(A,B) in which each item is formed by concatenating two items, one from each of the two argument relations A and B, which have the same value in a common field of their keys. Join is very different from the set operations, because the two argument relations to be joined may have different key length and the common field of the two relations may be in different places. Moreover, J(A,B) may have many more elements than the sum of the numbers of elements in relations A and B. To carry out the join operation on relations A and B, all of their items a's and b's are fed into prefilters 60 as done in the binary set operations. In passing through a prefilter 60, the common field is extracted and concatenated with a tag byte and then the item itself to form a new item a or b as follows:

$$\bar{a} = \text{common field} \ \Box \ \text{tag byte} \ t_a \ \Box \ a$$

$$\bar{b} = \text{common field} \ \Box \ \text{tag byte} \ t_b \ \Box \ b$$

where $t_a > t_b$ and $\Box$ means concatenation. Notice that the tag $t_a$ or $t_b$, is put in a lower significant position than the common field. Now, the field $$\text{common field} \ \Box \ \text{tag byte}$$

is used as the new key, and treat the items a, b as pointers to start the sorting process. At the root 16 of the merge tree 14, we obtain a sorted string consisting of $\bar{a}$'s and $\bar{b}$'s in which all the $\bar{a}$'s or $\bar{b}$'s having the same new key are grouped together. The group of $\bar{b}$'s having identical value in the common field immediately follows the group of $\bar{a}$'s having the same value in the common field.

Figure 14:
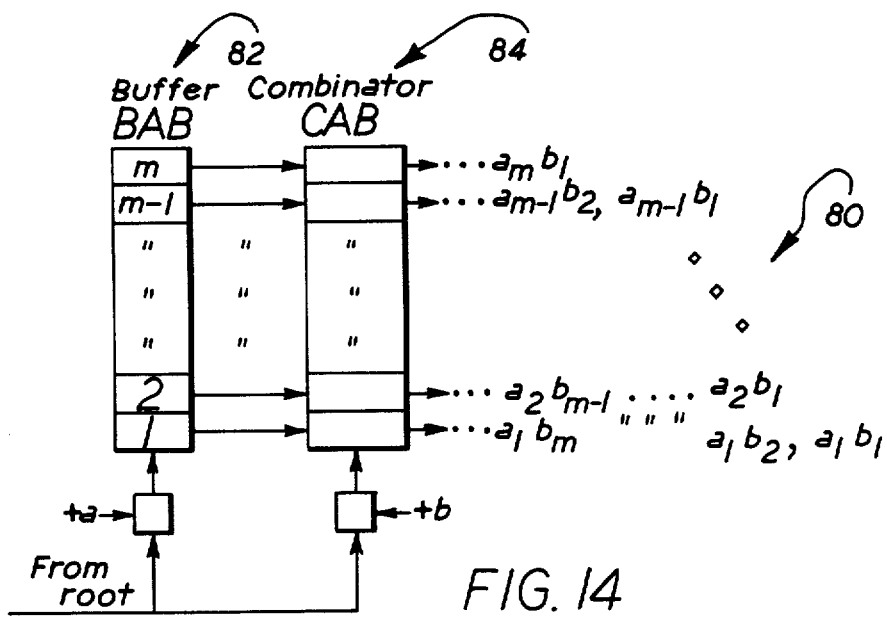

The output string from the root 16 is then fed into a special type of postfilter 80, called join maker shown in FIG. 14, and the output strings generated constitute J(A,B). The join maker consists of a column of buffer registers BAB 82, and a column of combinators CAB 84. Each register in BAB can hold an item. The group of $\bar{a}$'s with identical value in the common field arrives first, and then the group of $\bar{b}$'s with the same value in the common field immediately follows. As an extended item $\bar{a}$ or $\bar{b}$ arrives, its extended pointer is extracted (i.e., the new key removed) and guided by the tag switch $t_a$ or $t_b$, to BAB 82 or CAB 84, respectively). With the group of $\bar{a}$'s stored in BAB 82 and as a $\bar{b}$ item arrives at a combinator, the $\bar{b}$ combines with the $\bar{a}$ on the same row to produce an item $\overline{ab}$ of J(A,B). When a $\bar{b}$ item moves upward through the column of combinators 84, it combines with all a items in BAB to produce a sequence of $\overline{ab}$'s. Since the $\bar{b}$ items arrive one after another, the combinations are carried out concurrently in pipeline fashion.

Suppose that the a group has m items and the b group has n items. m×n items of J(A,B) will be produced in the period in which the m items of the a group and the n items of the b group flow out the root of the tree 14. Immediately after the last item of the b group enters the join maker it combines with the a items in BAB 82 for the last time, and the items of the next group can replace the items of the a group in BAB 82. Thus, the output from the root flows into the join maker continuously without interruption as soon as it comes out from the merge tree 14. Similar to other database operations, the join operation is performed at the sorting speed, the time complexity of the join operation being of the order $p(V_A + V_B)$, where $V_A$ and $V_B$ are the odd number of items in relations A and B respectively.

While a presently preferred embodiment of the invention has been shown and described in particularity, it may be otherwise embodied within the scope of the appended claims.

What is claimed is:

1. A pipeline feedback array sorter comprising:
   (a) a multi-string sort array having m inputs and outputs, where m is the width of said array or the number of data strings and is greater than or equal to 2;
   (b) a merge tree array having q leave nodes connected to the output of one of p buffer memories through a multiplexor for successively merging the columns of a buffer memory to fill subsequent buffer memory columns and having an output from the root node, where q is greater than or equal to 2 and p is greater than or equal to 1;
   (c) a first buffer memory having m inputs connected to the corresponding m outputs of said multi-string sort array for filling said first buffer memory and q outputs, said first buffer memory having m×q memory units, each of said units for holding one data item, said first buffer memory having two dimensional data movements;
   (d) p−1 buffer memories in feedback loops and having a single dimensional data movement, each of said p−1 buffer memories having an input connected with said output of said merge tree array and q outputs connected to said q leave nodes of said merge tree array, wherein each of said p buffer memories serve as input buffers to said merge tree array; and
   (e) a multiplexor for controlling and filling from said first buffer memory and p−1 buffer memories electrically connected to the inputs to said merge tree, whereby merging the columns of the p-th buffer memory a final sort is obtained from said root node of said merge tree array.

2. A pipeline array sorter as set forth in claim 1 wherein said multi-string sort array is a triangular array of cells adapted to implement a bubble sort algorithm.

3. A pipeline feedback array sorter as set forth in claims 1 or 2, wherein an interface controller including a multiplexor and said buffer memory modules comprises a small q-port memory and a large single port memory so as to provide p-memory modules each having q-ports, and wherein said multiplexor is a two way multiplexor electrically connected to said buffer modules whereby the output of the single port memory is combined with the output of the q-port memory.

4. A pipeline feedback array sorter as set forth in claim 3, wherein the number of cells in said array sorter and merge tree is $(1+\frac{1}{2}p)(v/m)^{1/p}$, where $v = mq^p$ and represents the number of data items to be sorted.

5. A pipeline feedback array sorter as set forth in claim 1 for use in relational database operations including m prefilters electrically connect to the input of said sort array and programmed to carry out tagging data items and concatenating said tags and outputting said tagged data to said array sorter, each of said prefilters having a group of recycling shift registers, a pair of output registers and a controller electrically connected together and post-filters electrically connected to the root of said merge tree having at least three registers, a comparator and gate controlled by the output of said comparator connected to the output of said merge tree for performing non-unary operations.

6. A pipeline feedback array sorter as set forth in claim 5 including a plurality of post-filters electrically connected to the root of said merge tree array for performing intersection, difference and union operations.

7. A pipeline feedback array sorter as set forth in claim 6, wherein said post-filter includes an input storage register connected to the output of said merge tree, a pair of registers having their respective inputs connected to the output of the input storage register, a comparator connected to both registers and a pair of gates connected to the outputs of both of said registers and controlled by said comparator.

8. A pipeline feedback array sorter as set forth in claim 5 including a post-filter for JOIN operations.

9. A pipeline feedback array sorter as set forth in claim 8 wherein said post-filter comprises a column of buffer registers and a column of combinators connected to the output of said merge tree.

* * * * *

UNITED STATES PATENT AND TRADEMARK OFFICE
CERTIFICATE OF CORRECTION

PATENT NO. : 4,799,152
DATED : January 17, 1989
INVENTOR(S) : Henry Y. H. Chuang and Guo Ho It is certified that error appears in the above-identified patent and that said Letters Patent is hereby corrected as shown below:

Column 4, line 19, the term "$D_mNM$" should read -- $D_mN_m$ -- .

Column 5, line 6, the term "int" should read -- into -- .

Column 7, line 18, the term "CS=1" should read -- CX=1 -- .

Column 9, line 2, the term "and" should read -- an -- .

Column 9, line 34, the term "i-1" should read -- i=1 -- .

Column 9, line 39, the term "first log2q'1" should read -- first $\log_2 q^{-1}$ -- .

Column 9, line 45, the term "$mq^{I-1}-\log^2q+1$" should read -- $mq^{i-1}-\log_2 q+1$ -- .

Column 9, line 67, the term "i-1" should read -- i=1 -- .

Column 10, line 5, the column headings "startng address" and "endng address" should read -- starting address -- and -- ending address -- , respectively.

Column 11, line 20, the heading "d. reduced cell number:" should read -- d. Reduced Cell Number: -- .

UNITED STATES PATENT AND TRADEMARK OFFICE
CERTIFICATE OF CORRECTION

PATENT NO. : 4,799,152
DATED : January 17, 1989
INVENTOR(S) : Henry Y. H. Chuang and Guo Ho It is certified that error appears in the above—identified patent and that said Letters Patent is hereby corrected as shown below:

Column 11, line 38, the formula "$S_C=\tfrac{1}{2}m(m+1)+1-1$" should read -- $S_C=\tfrac{1}{2}m(m+1)+q-1.$ -- .

Column 12, line 54, the term "$m_i$" should read -- $M_i$ -- .

Column 13, line 4, the term "if" should read -- If -- .

Column 14, line 20, the word "the", second occurrence, should read -- them -- .

Column 14, line 48, the word "the", first occurrence, should read -- then -- .

Column 14, line 56, the word "n-aryl" should read -- n-ary -- .

Column 16, Claim 2, first line, the term "pipeline array" should read -- pipeline feedback array -- .

Signed and Sealed this

Fifteenth Day of August, 1989

Attest:

DONALD J. QUIGG

Attesting Officer

Commissioner of Patents and Trademarks